Figure 1:
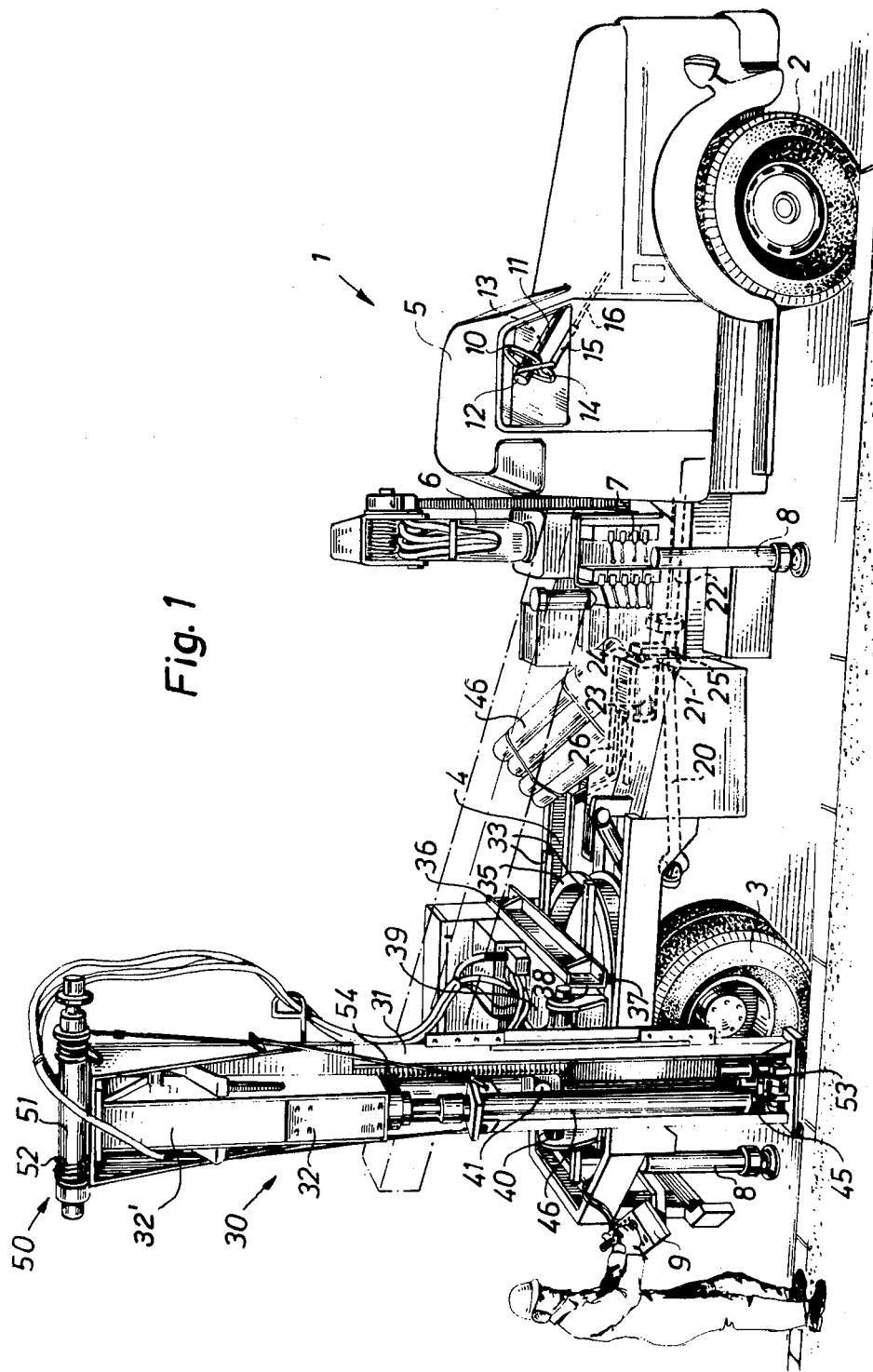

United States Patent [19]

Wibom

[11] 4,442,904
[45] Apr. 17, 1984

[54] VEHICLE MOUNTED HOLE FORMING MACHINE

[76] Inventor: Gustav H. O. Wibom, Skogsvägen 12, S-181 41 Lidingö, Sweden

[21] Appl. No.: 204,402

[22] PCT Filed: Nov. 30, 1979

[86] PCT No.: PCT/SE79/00244

§ 371 Date: Aug. 1, 1980

§ 102(e) Date: Jul. 24, 1980

[87] PCT Pub. No.: WO80/01154

PCT Pub. Date: Jun. 12, 1980

[30] Foreign Application Priority Data

Dec. 1, 1978 [DE] Fed. Rep. of Germany ....... 7812412

[51] Int. Cl.³ .......................................... E21C 11/02
[52] U.S. Cl. .................................. 173/28; 180/324; 180/69.6
[58] Field of Search ............... 180/324, 54 C; 173/28, 173/23, 43, 133

[56] References Cited

U.S. PATENT DOCUMENTS

| | | | |
|---|---|---|---|
| 2,728,463 | 12/1955 | Beckwith | 180/54 C X |
| 3,384,186 | 5/1968 | Broderson et al. | 173/28 X |
| 3,507,338 | 4/1970 | McWaters et al. | 173/28 |
| 3,515,228 | 6/1970 | Henson | |
| 3,576,218 | 4/1971 | Lisenby | 173/28 |
| 3,754,604 | 8/1973 | Inaba et al. | 173/28 |
| 3,833,071 | 9/1974 | Koosman | |

FOREIGN PATENT DOCUMENTS

| | | |
|---|---|---|
| 2165535 | 7/1972 | Fed. Rep. of Germany . |
| 2165536 | 7/1972 | Fed. Rep. of Germany . |
| 361632 | 11/1973 | Sweden . |
| 7607644 | 10/1978 | Sweden . |

*Primary Examiner*—Robert R. Mackey
*Attorney, Agent, or Firm*—Sughrue, Mion, Zinn, Macpeak & Seas

[57] ABSTRACT

The invention refers both to a method of converting a vehicle, such as a truck, a tractor, a lorry or the like and to a steerable working machine for specific working purposes, e.g. a hammer arrangement for making holes, or a drilling machine and to a combined vehicle and working machine. The working machine (30) in question is mounted on the chassis of the vehicle (1) and is arranged to be operated from an operating location (9) which is fixed or movable relative to the vehicle. The vehicle is provided with an additional driving mechanism (23-25), e.g. a hydraulic motor having a driving element (25) which can be moved between an active and an inactive position and which is arranged to engage the vehicle wheels (3) or the vehicle transmission system (20, 21, 22) for slowly propelling the vehicle and a separate remote-control means (12-16) actuating the vehicle steering system (10, 11). The drive mechanism (23-25) and the remote-control means (12-16) are operated from said operating location (9).

2 Claims, 7 Drawing Figures

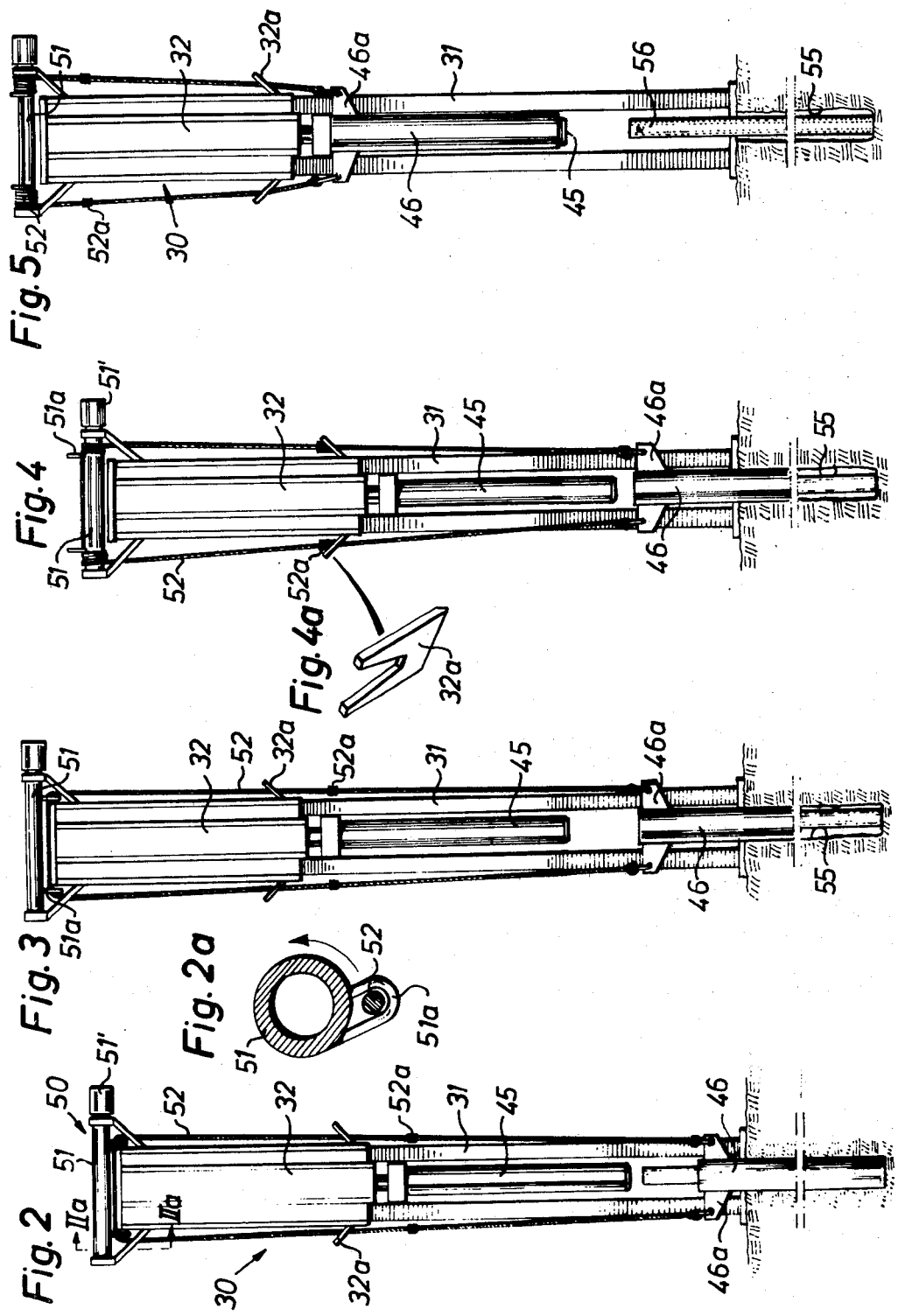

VEHICLE MOUNTED HOLE FORMING MACHINE

The present invention relates to a combined vehicle, such as a truck, tractor and the like, and a working machine, such as a drop-hammer for forming holes, a drilling machine or the like.

One object of the invention is to increase the field of use of a vehicle of the described kind, without seriously limiting the possibilities of the vehicle to be driven along the roads and highways.

Another object of the invention is to provide a working machine which is equipped to carry out specific work and which can be driven between different working sites quickly and comfortably, and which is economical in operation.

It has previously been proposed to mount a working machine, such as a drop-hammer or drilling machine, on the chassis or floor of a vehicle, and to provide means whereby said working machine can be operated from a fixed location on the vehicle or from a non-fixed location.

The vehicle according to the invention is provided with an additional driving mechanism, e.g. a hydraulic motor, having driving elements which are movable between an active and an inactive position and which engage the wheels of the vehicle or the transmission system of said vehicle in a manner to slowly propel the vehicle, and a separate remote-control means arranged to control the vehicle steering system; and in that means are provided for enabling said additional drive mechanism and said remote-control means to be operated from said operating location.

The additional drive mechanism and remote-control means enable the vehicle to be driven between various, closely adjacent locations on a working site where specific work is to be carried out, without the driver or operator needing to use the normal drive and steering means of the vehicle for this purpose. At the same time, the vehicle can be driven in a conventional manner to the working site in question, where the driver of the vehicle can be employed to operate the working machine mounted on the vehicle. The combination according to the invention affords particularly useful advantages in those cases where similar work is to be carried out at various, closely adjacent locations, such as the making of holes for fence posts along a road, in which case the working machine has the form of a drop-hammer, or when a plurality of closely adjacent drill holes are to be made in conjunction with a blasting operation, in which case the working machine may comprise a drilling machine.

One very important advantage is that the normal driving and steering systems of the vehicle can remain more or less intact, despite the provision of the additional driving mechanism and the separate remote-control means. Thus, this means that a vehicle converted in accordance with the invention fulfils the road-worthiness requirements etc. applicable when the vehicle is driven along roads and highways.

In practice, the working machine is preferably arranged on the vehicle in a manner such as to enable it to move between a rest position and a transport position, and one or more working positions at the side of and/or behind the vehicle.

The advantage is gained whereby the working machine can be readily transported to the working site in question, where the vehicle is readily converted to said working machine.

For the purpose of facilitating this conversion, the working machine is preferably arranged so that it can be swung around at least two mutually perpendicular axes and so that it can be displaced horizontally in the working position, i.e. transversely of and/or parallel with the longitudinal axis of the vehicle.

In accordance with one embodiment, a frame structure associated with the working machine is arranged for vertical movement, e.g. by telescoping so that it can serve as a vehicle-support element when the movable part of said working machine carries out work.

A simple and useful vehicle remote-control means can be provided by mounting in the center of the steering-wheel arrangement, an output shaft of a slowly rotatable motor, e.g. a hydraulic motor. This output shaft can be arranged to control the conventional steering shaft of the steering arrangement within the steering column. At the same time, a fixed part of said motor, e.g. its casing, can be connected to a fixed point on the vehicle.

In this way, the remote-control means can be readily mounted, by inserting the output shaft of the motor into the hole present in the center of the steering wheel, optionally subsequent to first removing a signal device or the like covering said hole. The motor of the remote-control means can be readily mounted when the casing of said motor is connected to said fixed location on the vehicle via a rod or the like which extends parallel with the steering rod of the vehicle.

The additional drive means of the vehicle can be provided with a hollow output shaft arranged parallel with the universal driving shaft of the vehicle in the region where said shaft is joined to an intermediate shaft. When the additional drive means is displaced, its output shaft will move to said active position, where it engages about said joint location. Thus, rotation of the drive means will be transmitted directly to said intermediate shaft, thereby causing the drive wheels of the vehicle to turn.

In an alternative arrangement, the output shaft of the additional drive means may be provided with a wheel or a roller suitably constructed, said wheel or roller exerting frictional engagement against one of the wheels of the vehicle.

The operating location for the working machine, the additional drive means and the remote-control means may suitably be at a point on one side of the vehicle or behind said vehicle, so that the operator has a clear view of the working machine and the area close in front of the vehicle, i.e. so that both the working machine and the vehicle can be driven from the working location in question without disadvantage or without taking unnecessary risk. The operating location may have the form of a panel incorporating the control means necessary for the given functions, suitably a combination of hydraulic control means and valve means, and electric switches.

In a combination according to the invention, it is preferred that the working machine is carried by a slide arranged for horizontal movement in guides, said slide being turnable or rotatable on a horizontal turn plate and being connectable in the working position of said machine with force-absorbing beams comprising part of or joined to the floor or chassis of the vehicle.

In this way, there is obtained in said working position a particularly stable support for the machine while enabling said machine to be moved to its rest or transport position in a simple manner.

In one combination of the aforedescribed kind, the working machine comprises a drop-hammer arrangement for making holes and includes (a) a frame part,
(b) a hammer, which, in the working position, is arranged to be moved vertically along the frame part by means of a hydraulic device,
(c) a massive pierce or drift carried by the hammer, and
(d) a casing tube which surrounds the drift either completely or partially.

Such a casting tube is used when making holes in certain kinds of ground, said tube preventing the walls of a hole collapsing before a post or the like can be inserted thereinto. Quite often, however, the casing tube becomes firmly wedged in the hole, requiring a relatively large force to withdraw said tube from the ground.

To facilitate withdrawal of the casing tube from the ground, a preferred combination of the aforedescribed kind is characterized by a winch arrangement having a line attached to said casing and extending on both sides of the hammer, for drawing said casing out of the ground, said line being arranged to coact with the hammer in a manner such that the hydraulic device for vertically moving the hammer can serve to withdraw said tube while relieving the winch arrangement.

The arrangement can also be such that the actual withdrawing operation is carried out in two stages in which the hydraulic device assists in the tube-withdrawing operation. During the first stage, a horizontal upper part of the line lies against the upper part of the hammer, while during the second stage, in which part of the line is wound on the winch drum, fork-like means or the like arranged on the hammer engage separate means arranged on said line for said purpose. In both cases, the powerful hydraulic device which provides the vertical movement of the hammer arrangement via a chain or line, assists in the withdrawal of the tube from the ground to a point where said tube is substantially loosened from said ground, so that the winch is able to complete the withdrawing operation.

In order to satisfy those requirements placed in practice on a hammer arrangement of the kind described, it is preferred that said hammer frame part is pivotable or rotatable in its essentially vertical working position around at least one substantially horizontal axis. In practice, it is preferred that the hammer arrangement on said turn plate is rotatable about a substantially vertical axis and about two mutually perpendicular horizontal axes. In this way, the hammer arrangement can be moved into various inclined positions relative to the vehicle, which is an advantage when making certain types of holes. As a whole, a working machine in the form of a hammer arrangement of the described kind is highly flexible, to which the additional drive mechanism and separate remote-control means contribute.

According to a second aspect, the invention also concerns a method of producing, from a vehicle, such as a truck or a tractor, a transporatable working machine for specific working purposes, e.g. a hammer for hole making, a drilling machine or the like, the vehicle being, in addition to the ordinary driving motor and transmission system, provided with an additional drive mechanism and a remote-control means, arranged to control the vehicle steering system, the working machine in question, e.g. said hammer or said drilling machine, being mounted on the chassis or the floor of said vehicle and together with the additional drive mechanism and the remote-control means being actuable from an operating location at a fixed point relative to said vehicle or a non-fixed point, characterized in that the additional drive mechanism of the vehicle, e.g. consisting of a hydraulic motor, is provided with a drive element, which is movable between an active and an inactive position and which, without being part of the ordinary transmission system of the vehicle, engages said transmission system or the vehicle wheels for slowly propelling the vehicle, and that the working machine is so arranged that it is movable between a transport position substantially parallel with the longitudinal axis of the vehicle and a substantially vertical working position on one side of or behind the vehicle, in which working position a frame part associated with the working machine is held loosably fixed relatively to the vehicle and supports against the ground.

Exemplary embodiments of the invention will now be described in more detail with reference to the accompanying drawings.

FIG. 1 is a perspective view of a truck combined with a working tool in the form of a hammer arrangement, FIGS. 2-5 are front views of the working tool during various stages of withdrawing a casing tube from the ground, FIGS. 2a and 4a illustrating elements in the form of a section taken on the line IIa—IIa in FIG. 2 and a perspective part view in larger scale of an element shown in FIG. 4.

In FIG. 1, the reference 1 identifies a truck which has been converted so that it can simultaneously serve as a working machine in the form of a hammer arrangement for making holes. In FIG. 1, the hammer arrangement is generally identified by the reference 30 and is shown in full lines, while the rest position of said machine on the floor 4 of the truck is shown in chain lines.

The truck 1 is more or less of conventional design having front wheels 2, rear wheels 3, a driving cabin 5 and a hydraulically-actuated lifting means 6, said means 6 being operated from an operating location 7 behind the cabin. The truck is also provided with hydraulically activatable support legs 8.

The driver cabin 5 is equipped in a conventional manner with steering means in the form of a steering wheel 10 and a steering rod 11.

The steering means, however, is arranged to be operated from a location outside the drive cabin, in the illustrated case from an operating panel 9 in the region of the rear part of the vehicle. To this end, the signal means normally located in the center of the steering wheel 10 has been removed and an output shaft 13 of a hydraulic motor 12 inserted, said hydraulic motor 12 being operated from the panel 9. The output shaft 13 of the motor 12 directly engages the steering axle (not shown) located in the steering rod 11, so that the forward wheels 2 of the vehicle can be steered by rotating the motor 12 in either direction.

To enable the remote-control means to be reliably operated, the casing of the motor 12 is joined to a fixed point of the vehicle. This is achieved in the FIG. 1 embodiment, by joining a transversely extending rod 14 with a rod 15 which extends parallel with the steering rod 11 and which when the motor 12 is mounted in position in the center of the steering wheel is inserted into a tube 16 fixedly connected to said vehicle, said tube 16 also extending parallel with the steering rod 11. In this way, the remote-control means can be readily mounted in position and removed when the vehicle is to be driven in a conventional manner along a road or highway.

In order also to enable the vehicle to be propelled over short distances by means of operating signals sent from the panel 9 without using the normal drive means of the vehicle, there is provided an additional drive mechanism which can be operated from said operating panel 9.

The drive mechanism acts on the conventional vehicle transmission system, whose cardan shaft 20, universal coupling 21 and intermediate shaft 22 have been shown in dash lines in the Figure. The additional driving mechanism comprises a hydraulic motor having an output shaft 24 which carries a yoke 25 arranged to engage and encircle the universal coupling 21 when the hydraulic motor 23 is displaced on guides 26, so that the rotary movement of the motor is transmitted to the rear drive wheels 3 of the vehicle via the intermediate shaft 22.

Displacement of the drive motor 23 can be suitably effective manually, although it is, of course, also possible to guide the displacement of the motor to said active position from the panel 9, if so desired.

Irrespective of the kind of additional driving mechanism used, it will be understood that the vehicle transmission system shall be disengaged from the conventional drive motor of the vehicle.

In the FIG. 1 embodiment, the working tool machine 30 carried on the vehicle floor 4 comprises a hammer arrangement 30 for making holes. The hammer arrangement comprises a frame part 31 which forms a so-called feed beam for the hammer 32, said hammer carrying at its lower end a solid drift or pierce 45 which—with the exception of its lower end—is surrounded by a casing tube 46.

The hammer arrangement 30 is arranged for movement between the working position shown in full lines in FIG. 1 and the rest or transport position shown in chain lines, in which latter position it is parallel with the longitudinal axis of the vehicle.

For carrying the hammer arrangement, there is provided on the vehicle floor 4, a circular turn-plate 35 which carries two mutually parallel beams 36 (only one of which is shown in FIG. 1), said beams being movable on said turnplate 35 by means of wheels or rollers 37. The two beams 36 together form a guide for the horizontal displacement of a slide 39 which carries the frame part of said working machine 30 via two horizontal shafts 40 and 41, which are mutually perpendicular to one another. In addition to being possible to move the slide, and therewith the working machine, horizontally in the guides formed by the beams 36, to positions at different distances from the sides or the rear of the vehicle, the frame part 31 of the working machine 30 can be swung or pivoted on the two shafts 40 and 41, so that said frame part can be adjusted to different inclined positions relative to the vehicle. The shaft 40 has a greater horizontal length than the width of the frame part, and hence said frame part is also horizontally displaceable on the shaft 40.

When the working tool or machine has been brought to said vertical working position, the beams 36 are secured relative to the turn plate, and therewith relative to the floor or chassis of the vehicle, by means of separate rods or beams 33, which can be inserted between said beams 36 and the turn-plate 35. The slide 39, however, can still be displaced in the aforedescribed manner relative to the guide 38 formed by the beams 36.

In the working position, the frame part 31 is caused to telescope downwardly by means of the hydraulic device 53, so that the frame part forms a support against the ground or foundation surface for the working machine.

In addition, the support legs 8 are suitably used for the same purpose, whereby the working machine obtains satisfactory support in order to be able to work in the manner intended.

FIGS. 2–5 illustrate the main part of a working machine in the form of a hammer arrangement, designed to facilitate withdrawal of a casing tube which has been pressed into the ground. As with the FIG. 1 embodiment, the hammer 32 carries a solid drift or pierce 45, the lower end of which has been cut square. In the starting position illustrated in FIG. 2, the drift and the casing tube 46 surrounding said drift have been driven into the ground, whereafter the hammer 32 and the drift 45 have been raised. For the purpose of withdrawing the casing tube from the ground, there is provided at the upper part of the hammer 32 a winch arrangement 50 having a drum 51 and a drive motor 51'. The winch is arranged to co-operate with a line 52 comprising two parts, one on each side of the hammer, said line parts being joined to outstanding flanges 46a on the casing tube.

In many cases, the force exerted by the winch 50 is not sufficient to withdraw the tube from the ground, especially when said tube has become wedged in the hole formed, and hence a separate arrangement is used to withdraw said tube from the ground with the assistance of the hydraulic device 32' by which the hammer 32 is moved along the frame part 31.

Thus, the winch drum 51 is provided with two stirrups 51a (c.f. FIG. 2a) which take-up the line 52 in a manner such that said line simultaneously rests against the upper end of the hammer 32. When the hammer is moved upwards from the position shown in FIG. 2 to the position shown in FIG. 3, the tube 46 will be lifted, while at the same time relieving the winch arrangement 50. Even-though the casing tube in the position illustrated in FIG. 3 may be too firmly wedged in the ground in order to be remoed therefrom by means of the winch arrangement, there is provided an arrangement which permits "regrip" and renewed withdrawal of said tube with the aid of the hydraulic device for operating the hammer arrangement. Thus, the hammer arrangement 32 is provided on the sides thereof with obliquely outwardly extending lugs 32a (c.f. FIG. 4a) having V-shaped recesses arranged to engage separate stop means 52a—e.g. "knots"—on the line 52. FIG. 4 illustrates how said lugs 32a engage the stop means 52a, for carrying out a second stage in the withdrawal of said tube from the ground.

The third stage in the withdrawing operation is illustrated in FIG. 5. During the second stage, the tube has been loosened in the ground, so that the winch arrangement 50 can be used to finally withdraw said tube from said ground. The design of the stirrups 51a illustrated in FIG. 2a cause the two parts of the line 52 to be wound symmetrically onto the drum 51.

FIGS. 3, 4 and 5 illustrate a post 56 which has been inserted in the hole 55 formed by the drift, prior to the tube 46 being removed.

In certain instances, the tube may be made of paper or some other material which can be left in the hole 55. These tubes have a smaller diameter than the tube 46 illustrated in the drawing, which tube 46 suitably comprises steel, and is inserted in the lastmentioned tube before it is withdrawn from the ground. FIG. 1 illustrates a plurality of such tubes 46 made of a paper material on the floor of the truck.

A vehicle converted in accordance with the invention can support other types of working machine without departing from the concept of the invention. For example, the vehicle may carry a drilling machine arranged for movement in a corresponding manner between a rest position and a working position. Various types of hydraulic devices etc. can be used to move the working machine between its two limit positions.

I claim:

1. In a vehicle of the type having a rear floor, a front driving cabin, main drive means for driving the rear wheels of the vehicle, and main steering means for controlling the front wheels of the vehicle, wherein said main drive means and said main steering means are operated from said driving cabin, the improvement comprising a stationary turn plate mounted on said rear floor adjacent the rear end of said vehicle, a pair of parallel spaced apart guide means carried by said turn plate for rotation on said turn plate, slide means mounted for horizontal reciprocating movement in said guide means, a working machine having an elongated support frame, first horizontal pivot means connecting said support frame to said slide means whereby said support frame may be pivoted between a substantially vertical position and a horizontal position overlying said vehicle with the lower end of said support frame directed forwardly of the vehicle, second horizontal pivot means disposed orthogonal to said first horizontal pivot means for pivotally connecting said support frame to said slide means, hammer means arranged to be moved vertically along said support frame, hydraulic means for moving said hammer means, a drift member carried by said hammer means, a casing tube surrounding said drift member, winch means having a line disposed on both sides of said hammer means and connected to said casing tube for lifting said casing tube, and means on said line being arranged to co-act with said hammer means in a manner such that when such hammer means is lifted vertically, said hydraulic means assists in lifting said casing tube, thereby relieving strain on said winch means.

2. In a vehicle as set forth in claim 1, wherein said means on said line comprises stop means on said line on opposite sides of said hammer means and lug means secured to said hammer means and extending outwardly from opposite sides thereof for engagement with said stop means for raising said casing means connected to said line upon lifting up said hammer means.

* * * * *